(12) United States Patent
Gonon

(10) Patent No.: US 6,598,516 B1
(45) Date of Patent: Jul. 29, 2003

(54) APPARATUS FOR PRODUCTION OF ICE-CREAM

(75) Inventor: Peter Gonon, Arhus (DK)

(73) Assignee: Tetra Laval Holding & Finance S.A., Pully (CH)

( * ) Notice: Subject to any disclaimer, the term of this patent is extended or adjusted under 35 U.S.C. 154(b) by 0 days.

(21) Appl. No.: 09/618,112

(22) Filed: Jul. 17, 2000

Related U.S. Application Data

(63) Continuation of application No. 09/101,780, filed as application No. PCT/DK97/00028 on Jan. 22, 1997, now abandoned.

(30) Foreign Application Priority Data

Jan. 22, 1996 (DK) ............................................. 0082/96

(51) Int. Cl.⁷ .................................................. A23P 1/16
(52) U.S. Cl. ............................ 99/455; 99/460; 99/483; 62/342; 62/354; 62/349; 165/94; 165/DIG. 77
(58) Field of Search ................................. 426/100, 101, 426/515, 516, 524, 565; 99/452, 455, 460, 483; 62/340, 342, 343, 354, 349; 366/105, 149; 165/94, 95, 87, DIG. 76–77, DIG. 81, 91

(56) References Cited

U.S. PATENT DOCUMENTS

| | | | | |
|---|---|---|---|---|
| 2,150,943 A | * | 3/1939 | Sharples | 99/119 |
| 4,758,097 A | | 7/1988 | Iles, Sr. | 366/149 |
| 4,850,842 A | | 7/1989 | Van Alstine | 425/205 |
| 5,030,465 A | * | 7/1991 | Curry et al. | 426/474 |
| 5,089,284 A | | 2/1992 | Irvin et al. | 426/557 |
| 5,201,861 A | | 4/1993 | Menzel | 62/135 |
| 5,264,234 A | * | 11/1993 | Windhab et al. | 426/519 |
| 5,345,781 A | | 9/1994 | Fels et al. | 62/343 |
| 5,460,014 A | * | 10/1995 | Wang | 62/354 |
| 5,487,605 A | * | 1/1996 | Zehle et al. | 366/300 |
| 5,713,209 A | * | 2/1998 | Hunchar et al. | 62/68 |
| 5,894,030 A | | 4/1999 | Gibson et al. | 426/524 |
| 5,919,510 A | | 7/1999 | Fayard et al. | 426/565 |
| 6,051,267 A | * | 4/2000 | Jury et al. | 426/516 |
| 6,228,412 B1 | * | 5/2001 | Groux et al. | 426/516 |

FOREIGN PATENT DOCUMENTS

| | | | |
|---|---|---|---|
| DE | 1007791 | * | 5/1957 |
| DE | 38 37 604 | | 5/1990 |
| DE | 39 18 268 | | 7/1990 |
| EP | 0 401 512 | | 12/1990 |

* cited by examiner

Primary Examiner—Keith Hendricks
Assistant Examiner—Drew Becker
(74) Attorney, Agent, or Firm—Nixon Peabody LLP; David S. Safran

(57) ABSTRACT

In the production of ice-cream products which are continuously extruded after passage of a flowthrough freezer, it would be ideal if the ice-cream could hereby be brought down to a discharge temperature of −12 to −25 degrees centigrade, as the products could then be brought directly to final storing. So far, however, this has not been practically possible, since the use of conventional production technique with associated. throughflow freezers creates fatal problems with respect to an unacceptable compaction of the air filled ice-cream and the heat development by the conveying and scraping effect of the conveyor worm in the throughflow freezer. The invention provides for a solution of both of these problems, partly by ensuring an acceptable air filling in using an adjustable resistance at the discharge side of the freezer, and partly in that this freezer itself is provided with a conveyor worm which, for effecting a very low scraping speed, has a very high pitch and is driven with an unusually low speed of rotation.

5 Claims, 1 Drawing Sheet

APPARATUS FOR PRODUCTION OF ICE-CREAM

This application is a continuation of application Ser. No. 09/101,780 filed on Oct. 19, 1998, now abandoned, which is a 371 of PCT/DK 97/00028, filed Jan. 22, 1997.

The present invention relates to the production of ice-cream material and more specifically to a production method of the type, by which the material in the form of the so-called mix with a substantial content of air is first cooled down to a conventional forming temperature of typically −5° C. and then brought further to a throughflow freezer, in which it is attempted to cool down the mass to a temperature of −15 or lower, preparatory to extruding the mass for the forming of the final ice-cream bodies for packing and final storing.

This 'type' of process is known from the literature, cf. DE-C-39 18 268, but not really from practice as far as usual ice-cream is concerned, since the process has been found to involve quite marked problems. At the principal level the process type is highly attractive, because ideally it would make it possible to form and pack the ice bodies directly to the final storing, without the conventional use of an intermediate and expensive low freezing system between the packing station and the final storage. Moreover, an intensive cooling of the mass will enable an improved product quality, in particular when producing larger block products.

The direct starting point of the invention was a teat system including a conventional throughflow freezer having a driven, scraping conveyor worm, dimensioned for a further conveying of the flow from the preceding, ordinary continuous freezer, which cools the mass down to some −5° C. As the flow remains unchanged it was natural to select increased or unchanged pipe dimensions. At the outset, a standard mix of ice-cream with a so-called overrun (degree of swelling) of 100% was used, and in the throughflow freezer an evaporator temperature of approximately −40° C. was used.

It was found rather soon that the achievable results were entirely unusable in practice. It was found that is was difficult to reach the desired low temperature of the ice-cream, and moreover the overrun was decreased quite unacceptably, down to 30–50%. Changed process parameters made no difference in this picture, but demonstrated that the drastical drop of the overrun was noticeably influenced by such changes A solution of the said problem was made difficult by the fact that it was not—and still is not—possible to precisely indicate the reason why the overrun turns out to be decreased.

However, according to the invention a surprising solution to the problem has been found, viz. by introduction of a controlled resistance in the flow from the throughflow freezer. From a processing point of view this will not be any particularly attractive solution, but it will be attractive anyway as long as it seems to be the only possibility of making the discussed 'type' of process practically usable at all. Also, the said resistance will not in any way need to be so high that it will indirectly reduce the production capacity to some commercially uninteresting level.

Thus, some additional energy should undeniably be used for the forcing out of the mass from the throughflow freezer, but this amounts to almost nothing in view of the fact that in return the discussed type of process can then be used in practice for achieving a really usable result, i.e. providing a final product having the desired overrun, structure and low temperature.

It could be desirable that it would be possible to introduce as a simple measure the said delivery flow restriction as a permanent pipe narrowing, but the further efforts in connection with the invention have shown that this will not normally be sufficient, as the optimum constriction is depending not only of the mechanical process parameters, but also of the formulation of the mix and the relevant process parameters. In practice, therefore, it seems to be a necessity to use a controllable, variable flow resistance. This may be realized by the use of an adjustable throttling valve or pressure regulating valve or by the use of a controlled, partial heating of a narrowed discharge pipe.

In that the flowthrough freezer should operate with a heavy cold transfer at extra low temperature, there is currently formed, on the inside of the freezer, an ice layer which should be scraped off. As it is also desired to effect a positive conveying of the ice-cream mass inside the cylinder, there will be no technical problem in combining such a scraping and conveying, viz. in using a scraping worm conveyors which is a known machine element, however, with a test system using such a known worm conveyor freezer the result is rather discouraging, as it is observed that in order to effect the scraping and the conveying of the ice-cream mass it is required to supply so much energy that the freezer becomes ineffective because of the applied scraping, kneading and pumping energy, which will reveal itself as a heat development, directly opposing the the freezing, This can be counteracted by using a furtherly lowered temperature on the cooling side, but only with the result that the building up of the said ice layer is promoted such that still more energy will be required for the scraping function, and it has been found that also this basic condition must be responsible for the discussed process 'type' not so far having been realized commercially.

On this background, and in connection with the invention, it has been considered whether it could be possible to provide an entirely different and more effective through flow freezer. Surprisingly enough, however, it has been found possible to maintain the relatively effective and simple concept of a worm conveyor, when only the traditional design thereof is drastically changed with respect to the rotational speed of the rotor and the pitch of the worm winding or windings.

For worm conveyors in connection with flowthrough freezers it is customary to use a rotor rotation at some 100–1000 r.p.m., least for larger cylinders and highest for cylinders with small diameter. For a representative worm conveyor with an inner worm diameter of 105 mm the rotor speed will typically be 200–600 r.p.m. which, by a typical worm pitch of between a whole and a half time the outer diameter of the worm will result in an axial scraping speed of 1–3.5 m/sec.

With the invention it has been found possible and optimal to operate with a revolution figure of only some 5–20 r.p.m. as well as with a worm pitch that is unusually large, viz. between one to two times the outer diameter of the worm, preferably between 1 and 1½ times this diameter. The said scraping speed will thus occur at a reduced value of only some 1–10% of the conventional standard, but it has been found that in return it is then possible to realize the process in practice. What is actual is a practically usable compromise between the effect of the applied energy being sufficient for conveying and scraping without causing undesired heating. It is a surprising result that that the low scraping speed and the associated low scraping frequency is sufficient for keeping the heat exchanger surface clean to such an extent that it is possible to operate with a practically acceptable efficiency of the heat exchange.

It is even to notice that for good reasons it is required to use a refrigerant with an evaporation temperature lower than the approximately −30° C., which to the skilled persons has been considered as a minimum evaporation temperature in connection with continuous ice-cream freezers; it has previously been found that with still lower temperatures there will occur a too heavy solid freezing of the ice-cream on the heat exchanger surface. Apparently it is a paradox that with the invention and the associated reduced scraping it is possible to operate effectively with freezing temperatures of −40° C. and colder, e.g. down to 100° C. and preferably in the range of −50 to −60° C. for achieving a good efficiency by the freezing down of the mass to about −15° through −22° C. It can only be confirmed, however, that the good results have been achieved by the use of the said modified continuous freezer, in which it is the worm itself that acts as the effective scraper tool.

There has been found no reason to assume that the aforementioned and in fact similarly important effect with respect to the preserving of the overrun should be particularly depending of the use of the discussed modified freezer, but on the other hand it can be confirmed that the relevant good result can be achieved also by the use of this freezer, such that the combined result renders the said 'type' of process realizable in commercial practice.

BRIEF DESCRIPTION OF THE DRAWINGS

The inventions illustrated in the drawing, in which:

FIG. 1 is a schematic diagram for illustrating the process, while

DETAILED DESCRIPTION OF THE INVENTION

Figure 1:
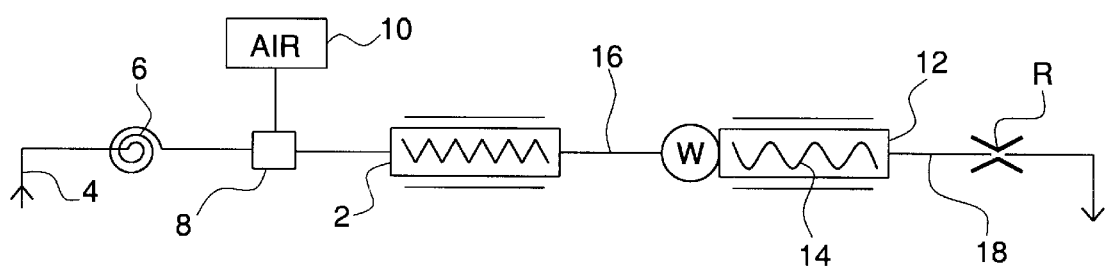

The processing system for producing extruded ice-cream products as schematically shown in FIG. 1 comprises a continuous freezer 2 which, from a supply 4, is supplied with 'mix' passing a pump 6 and a mixing chamber 8, in which the mix is mixed with air from a compressed air source 10 for achieving a overrun of traditionally some 100%. This ready made ice-cream substance is cooled in the continuous freezer 2 down to a temperature of approximately −5° C. as fully conventional for a subsequent portioning out and shaping of the substance.

In connection with the invention, however, it is desirable to convey the the cooled substance further through a continuous freezer 12 for a subsequent extrusion at a temperature of −12 to −25° C., such that the cut ice bodies can be packed for transfer directly to the freezing store. The freezer 12 should be positively conveying, i.e. it should comprise a conveyor worm 14 driven by a motor, which is here designated W in order to indicate that this driving will incur a certain supply of heat energy, partly for the conveying function itself and partly for the scraping work to be effected by the worm for scraping off the solid frozen ice-cream mass.

Owing to the associated increased viscosity of the mass it would be natural to use a somewhat enlarged dimension of the discharge pipe 18 compared with the supply pipe 16, but as mentioned it has been found that the final result of this is in fact unusable with respect to the overrun of the extruded mass. With the invention it has been found that this major problem can be solved by providing a discharge resistance R in the pipe 18. This resistance is relatively critical, insofar as it should be noticeable for achieving the desired result with respect to the overrun, but not so noticeable that it gives rise to the conveying resistance in the freezer 12 increasing to a level at which the required conveying energy reveals itself as an unacceptable heat generation in the freezer.

This in itself is a noticeable problem, because it may imply that it is very difficult to achieve the desired cooling of the ice-cream, practically no matter how much the freezer is cooled from the outside. This will be considered in more detail below.

First, it is important to note that normally the required flow resistance R should be statically or dynamically adjustable, as extensive tests have shown that the optimum resistance depends of various process parameters, including the formulation of the mix and the discharge temperature and capacity of the ice-cream. It is customary that in a given system there will be produced products with different formulations and process conditions, and the resistance R should be adjustable accordingly, based on gained experiences. Normally, as a standard, the pipe dimension at the discharge side of the freezer 12 should be slightly reduced, but the resistance should still be adjustable. This will be achievable by a differentiated partial heating of the narrower pipe, but preferably a controlled throttling valve or a pressure regulating valve should be used, for example a controllable constriction of a hose portion inserted in the discharge pipe Next, it is important that the continuous freezer 12 operates with a relatively very low temperature at the primary side, e.g. in the range of −40° to −100° C., and that it is made with a special geometry as far as the conveying/scraping worm is concerned, in connection with an equally unusually low rotational speed of the worm, preferably as low as 5–20 r.p.m.

Figure 2:
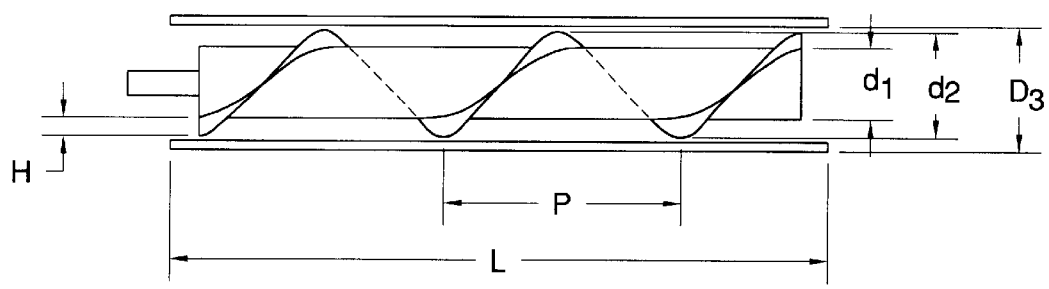
FIG. 2 is a schematic representation of a throughflow freezer according to the invention.

The freezer unit 12, 14 is indicated in more detail in FIG. 2 with the following designations of dimensions.

D1=diameter of rotor core;
D2=outer diameter of worm on this core;
D3=inner diameter of surrounding freezing cylinder;
L=length of freezing cylinder and worm; and
P=pitch of worm.

With the invention the following relations are preferred:

$$\frac{L}{D3} = 5-10;$$

$$\frac{P}{D2} = \frac{150}{105} = 1-2;$$

$$\frac{D2}{D1} = \frac{105}{75-90} = 1, 1 - 1, 4 \text{ (height of worm winding)}.$$

The pitch P should not necessarily be constant along the length L, as it may vary as desired for an optimized design and for reducing the ice-cream pressure during the conveying thereof through the freezer 12.

What is claimed is:

1. A system for effecting continuous production of a frozen ice cream substance while maintaining overrun of the frozen ice cream comprising:

a continuous freezer having a freezing cylinder with a driven screw worm scraping conveyor means for forcing the ice cream substance through and out of the freezing cylinder and for scraping off solid ice formations from an inner surface of the freezing cylinder, the freezing cylinder having an in-feed pipe of a first cross-sectional area and a discharge pipe connected to an extrusion outlet for discharging of the frozen ice cream substance; wherein a constriction is formed in the discharge pipe downstream of the extrusion outlet, said constriction having a smaller cross-sectional area than the first cross-sectional area of the in-feed pipe;

wherein, in order to maintain the overrun of the frozen ice cream, said screw worm scraping conveyor means comprises a single rotor with a conveyor worm screw having an outer scraping edge and a screw pitch that is 1–2 times an outer diameter of the worm screw, and a motor means connected to said rotor and having an operating speed which rotates the rotor at a speed in a range of 5 to 20 rpm.

2. A system for effecting continuous production of a frozen ice cream substance according to claim 1, wherein said constriction is provided with a means for controllably adjusting the flow resistance for the frozen ice cream substance by mechanically adjusting the cross-sectional area of the flow-through area of the constriction.

3. A system for effecting continuous production of a frozen ice cream substance according to claim 1, wherein the constriction is formed in the discharge pipe at an intermediate portion thereof which has a smaller cross-sectional area than the in-feed pipe; and wherein said portion is provided with an adjustable heating means.

4. A system for effecting continuous production of a frozen ice cream substance according to claim 1, wherein the outer diameter of the worm screw is 1.1 to 1.4 times an outer diameter of a core of the rotor from which the worm screw extends.

5. A system for effecting continuous production of a frozen ice cream substance according to claim 4, wherein the freezing cylinder has a length which is 5 to 10 times an inner diameter of the freezing cylinder.

* * * * *